(12) United States Patent
Cordeiro et al.

(10) Patent No.: US 8,279,895 B2
(45) Date of Patent: Oct. 2, 2012

(54) EFFICIENT CHANNEL ARCHITECTURES FOR MULTI-CHANNEL MAC PROTOCOLS IN WIRELESS AD HOC NETWORKS

(75) Inventors: Carlos M. Cordeiro, Ossining, NY (US); Javier Del Prado Pavon, Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 382 days.

(21) Appl. No.: 12/441,643

(22) PCT Filed: Sep. 21, 2007

(86) PCT No.: PCT/IB2007/053847
§ 371 (c)(1),
(2), (4) Date: Mar. 17, 2009

(87) PCT Pub. No.: WO2008/038211
PCT Pub. Date: Apr. 3, 2008

(65) Prior Publication Data
US 2009/0274140 A1 Nov. 5, 2009

Related U.S. Application Data

(60) Provisional application No. 60/826,956, filed on Sep. 26, 2006.

(51) Int. Cl.
*H04J 3/06* (2006.01)

(52) U.S. Cl. ........................................ 370/503; 370/350
(58) Field of Classification Search .................. 370/503, 370/350
See application file for complete search history.

(56) References Cited

U.S. PATENT DOCUMENTS

| 6,836,469 | B1 | 12/2004 | Wu | |
|---|---|---|---|---|
| 2003/0076812 | A1* | 4/2003 | Benedittis | 370/350 |
| 2004/0235489 | A1* | 11/2004 | Kwon | 455/452.2 |
| 2004/0240422 | A1* | 12/2004 | Kim | 370/348 |
| 2005/0163262 | A1* | 7/2005 | Gupta | 375/343 |
| 2006/0153203 | A1 | 7/2006 | Del Prado Pavon | |

FOREIGN PATENT DOCUMENTS

| WO | WO2005094007 A1 | 10/2005 |
|---|---|---|
| WO | WO20050112354 A1 | 11/2005 |

* cited by examiner

*Primary Examiner* — Jason Mattis
*Assistant Examiner* — Stephen J Clawson
(74) *Attorney, Agent, or Firm* — Larry Liberchuk

(57) ABSTRACT

The system (500), apparatus (400), and method of the present invention provide three architectures for logically organizing multiple channels: a parallel multi-channel superframe (PMS) (100), a sequential multi-channel superframe (SMS) (200), and a non-overlapping multi-channel superframe (NMS) (300). Each of these architectures arises from different trade-offs and is applicable to any multi-channel MAC protocol that is based on the concept of a superframe, e.g., IEEE 802.11 superframe.

24 Claims, 3 Drawing Sheets

EFFICIENT CHANNEL ARCHITECTURES FOR MULTI-CHANNEL MAC PROTOCOLS IN WIRELESS AD HOC NETWORKS

The system, apparatus, and method of the present invention relate to architectures for multi-channel medium access control (MAC) protocols in wireless ad hoc networks.

The majority of wireless MAC protocols, including the IEEE 802.11 MAC, have been designed to operate in a single shared channel. For example, even though the IEEE 802.11a physical (PHY) layer supports a total of 12 non-overlapping channels and the capability of dynamically switching between them (for the IEEE 802.11b PHY layer, a total of 3 non-overlapping channels are available), the current IEEE 802.11 MAC is unable to take advantage of this capability and is not suitable for operating in such a multi-channel environment.

Therefore, coupled with the demand for better spectrum reuse and enhanced data rates, there has been an increasing need for the development of MAC protocols that are able to exploit multiple PHY layer channels in a dynamic fashion. If properly designed, these so-called multi-channel MAC protocols can provide performance improvements by reducing collisions and allowing more simultaneous transmissions and hence better bandwidth utilization. Multi-channel MAC protocols enable nodes in the same neighborhood to communicate concurrently in different channels without interfering with each another. This characteristic is very desirable especially in high load scenarios and for QoS-sensitive traffic.

In order for a multi-channel MAC protocol to be successful, it has to offer a service similar to a single channel MAC (e.g., IEEE 802.11) together with superior performance. That is, a multi-channel MAC protocol must satisfy the following design goals: complexity and connectivity comparable to that of a single channel MAC; mobility support; handling of the multi-channel hidden terminal problem; broadcast/multicast support; load balancing; and increased throughput. For this set of requirements to be satisfied, it is necessary that the multiple PHY channels be structured in an intelligent way, otherwise a poor MAC performance results.

Therefore, a means for structuring a protocol for multiple PHY channels is needed.

The present invention includes an apparatus, method and system that provide three alternative protocols for multi-channel MAC in wireless ad hoc networks.

Existing wireless medium access control (MAC) standards such as IEEE 802.11 assume a single channel, although multiple channels may be available at the physical layer. With the promise of better spectrum reuse and improved performance, MAC protocols capable of dynamically managing multiple channels (so called multi-channel MAC protocols) are receiving increasingly attention. In order to fully exploit the available multiple physical layer (PHY) channels in an efficient manner, it is of paramount importance to consider the way these channels are structured to enable fast device discovery, full connectivity, load balancing, and optimal channel use.

The present invention provides three architectures for logically organizing multiple channels: a parallel multi-channel superframe (PMS) and a sequential multi-channel superframe (SMS), and a non-overlapping multi-channel superframe (NMS). Each of these architectures arises from different trade-offs and is applicable to any multi-channel MAC protocol that is based on the concept of a superframe, e.g., IEEE 802.11 superframe.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

The present invention provides an apparatus, method and system that provides a channel structure that spans all multiple PHY channels. In a preferred embodiment, three multi-channel PHY channels superframe structures are provided for high-speed communication of packetized systems:

a Parallel Multi-Channel Superframe (PMS) 100;
a Sequential Multi-Channel Superframe (SMS) 200;
a Non-overlapping Multi-channel Superframe (NMS).

Figure 1:
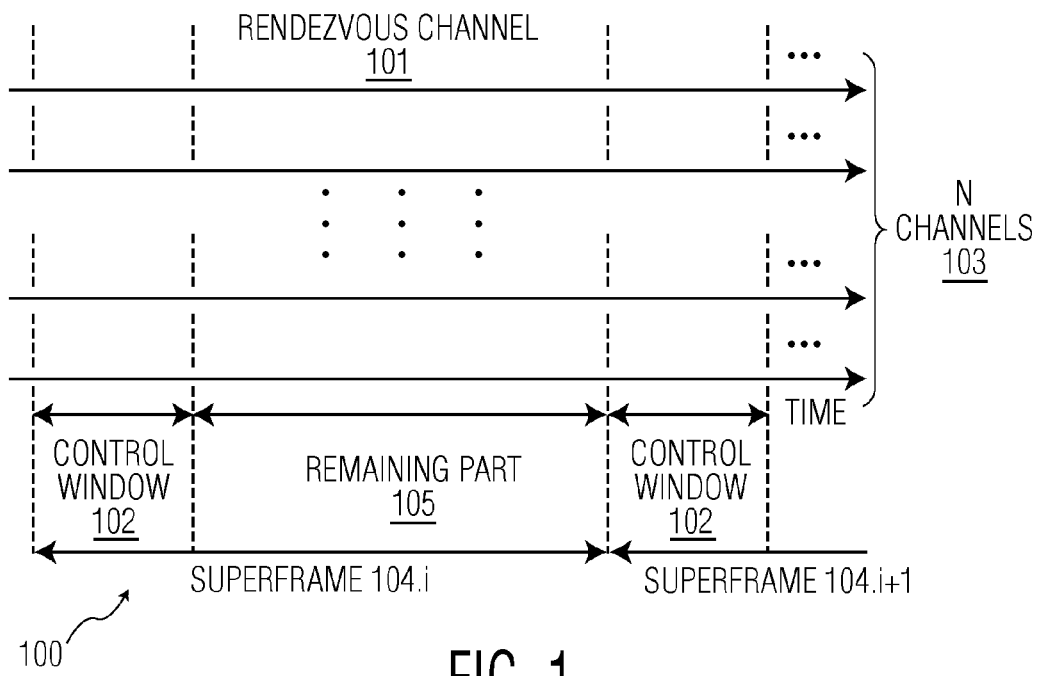
FIG. 1 illustrates a parallel multi-channel superframe (PMS)
Figure 2:
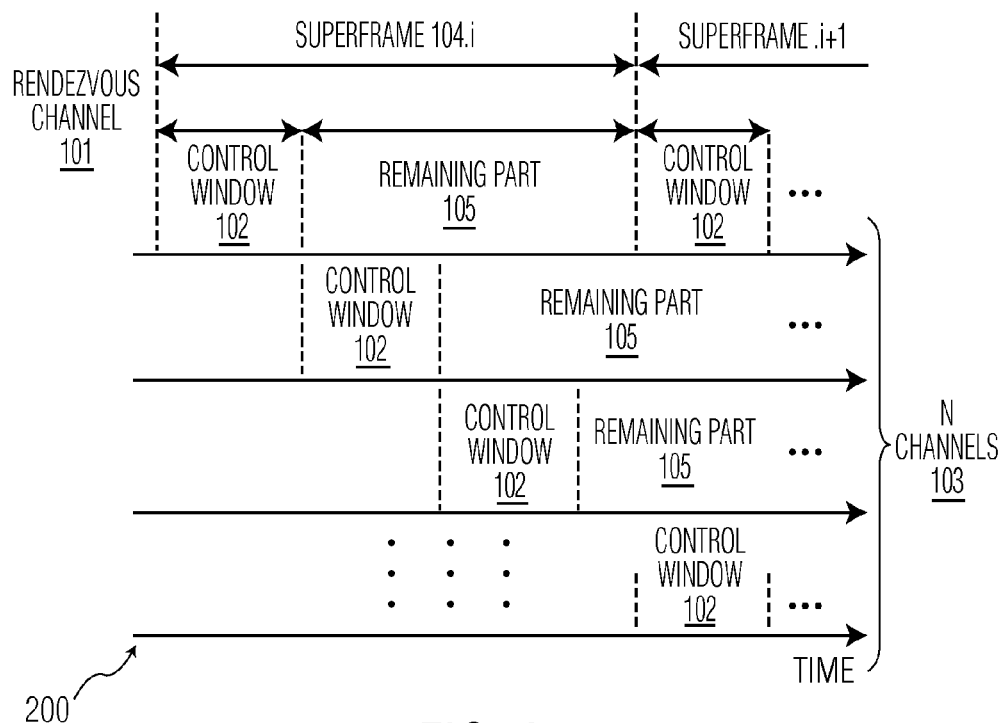
FIG. 2 illustrates a sequential multi-channel superframe (SMS)
Figure 3:
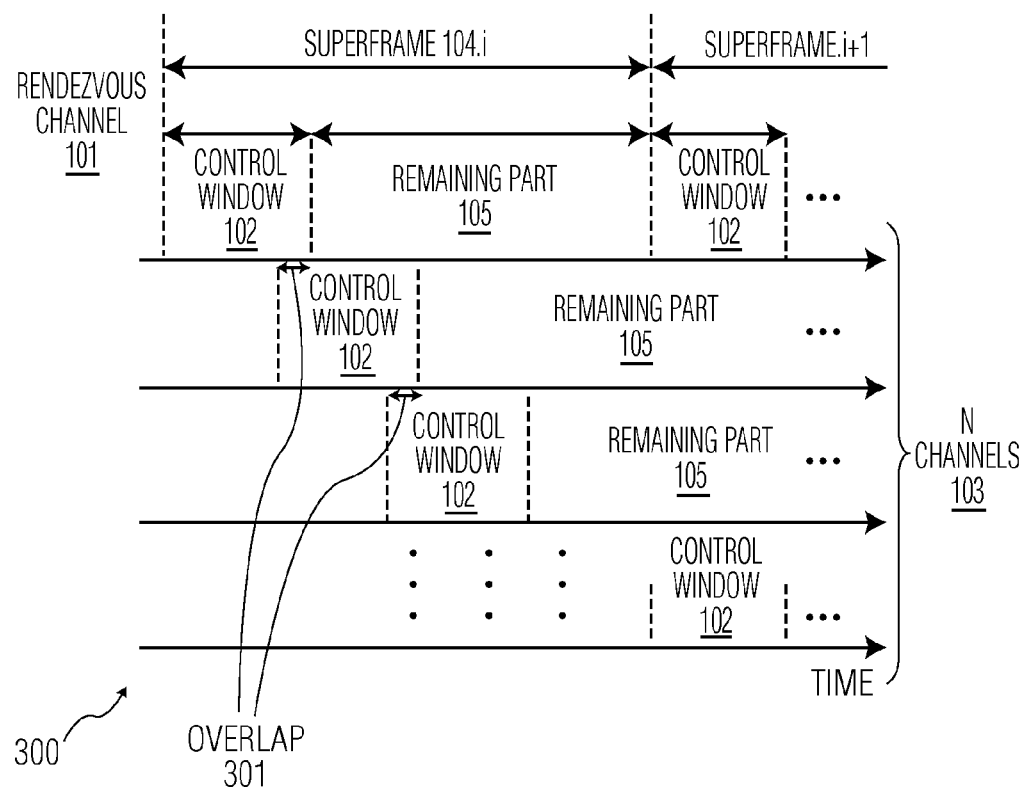
FIG. 3 illustrates a non-overlapping multi-channel superframe (NMS)

The PMS structure 100 is illustrated in FIG. 1, while the SMS structure 200 is illustrated in FIG. 2 and the NMS structure 300 is illustrated in FIG. 3. In a preferred embodiment these three approaches have in common the definition of a logical channel, herein termed as rendezvous channel 101, which serves as a meeting point for devices. This rendezvous channel 101 could be a single channel out of all channels available, as well as a subset of all channels available.

Referring now to FIG. 1, it can be seen that in PMS 100 superframes are synchronized across all multiple PHY channels. For this synchronization to be possible, the logical rendezvous channel is employed and allows devices to periodically tune in order to resynchronize. Depending on the MAC protocol in place, a device is able to discover the network connectivity by simply scanning the rendezvous channel. Alternatively, a device may have to scan each channel so as to discover its intended destination. As for data transmission, it is preferably carried out in any of the multiple channels simultaneously during the remaining part of the superframe.

As illustrated in FIG. 1, the PMS architecture 100 of the present invention is very suitable as it provides the foundation for efficient bandwidth usage, load balancing across channels, and so on.

FIG. 2 illustrates the channel organization in SMS 200. As illustrated, a distinguishing feature in SMS 200 is that superframes in sequential channels are time-shifted relative to one another as compared to PMS where superframes take place in parallel. A clear benefit from this approach is that a device can discover the entire network by simply sequentially scanning across the channels and listening for the duration of a control window 102. In a preferred embodiment, in order to allow for proper inter-channel synchronization, SMS 200 adopts the same concept as PMS by logically choosing one channel as the rendezvous channel to which devices periodically tune in order to resynchronize.

Referring now to FIG. 3, the NMS (300) employs a more loose synchronization as compared to the PMS and SMS. Here, the protocol needs to enforce only that the Control Window 102 of superframes 104 across multiple channels are substantially non-overlapping, wherein substantially is defined as the control windows of any two superframes overlap 301 by less than a pre-determined overlap allowance value. This way, tight synchronization is not required. On the other hand, scheduling of visits to other channels becomes more complicated as the Control Window 102 is no longer in sync.

When the PHY superframe structure is an NMS 300 a device 400 synchronizes/resynchronizes with the system 500 by performing a sequential scan of the control window 102 of each of a sequence of superframes of the NMS structure 300 across the plurality of channels 103 and the receiver 402 of the device 400 listens for at least the fixed duration of the control window 102 of each superframe 104 of the sequence to discover an intended destination. Once the device 400 is synchronized/resynchronized with the system 500, the transmitter 401 of the device 400 transmits data in the remaining part 105 of the superframe 104 of the discovered destination.

With these three channel structures, the target design goals are accomplished as follows:

Complexity and connectivity (or else, indirect connectivity) comparable to a single channel MAC—This is possible through the logical definition of the rendezvous channel. This channel serves as a meeting point where devices find about each other. In a preferred embodiment, this is accomplished either by having certain devices send announcements about others (e.g., as in the architecture of FIG. 1), or by having the device scan all channels (e.g., as in the architecture of FIG. 2).

Mobility support—While this feature highly depends on the MAC protocol design, the two architectures based on superframes of the present invention allow better mobility support by having, for example, all devices send beacon frames during the control window.

Handling of the multi-channel hidden terminal problem—The use of superframes with a control window together with the rendezvous channel concept make it possible for the multi-channel hidden terminal to be overcome. This is done by having devices listen and/or transmit during the control window period, and schedule the use of the various channels in a conflict-free manner.

Broadcast/multicast support—Broadcasting and multicasting are accomplished in a preferred embodiment through the use of the rendezvous channel concept. Devices tune to the rendezvous channel whenever a broadcast/multicast is in the queue for transmission, thus eliminating the need for a packet to be transmitted multiple times across all channels.

Load balancing—This is achieved by distributing devices across all multiple channels in a way such that all of these channels experience the same load. While this mechanism depends on the MAC protocol in place, the rendezvous channel and superframes of the present invention allow for appropriate load balancing.

Better bandwidth usage—This is possible as these architectures allow all channels to be simultaneously utilized, with minimal idle time (possibly due to the MAC protocol overhead). A proper load balancing scheme may further enhance the bandwidth usage by evenly distributing the transmissions across all channels.

Figure 4:
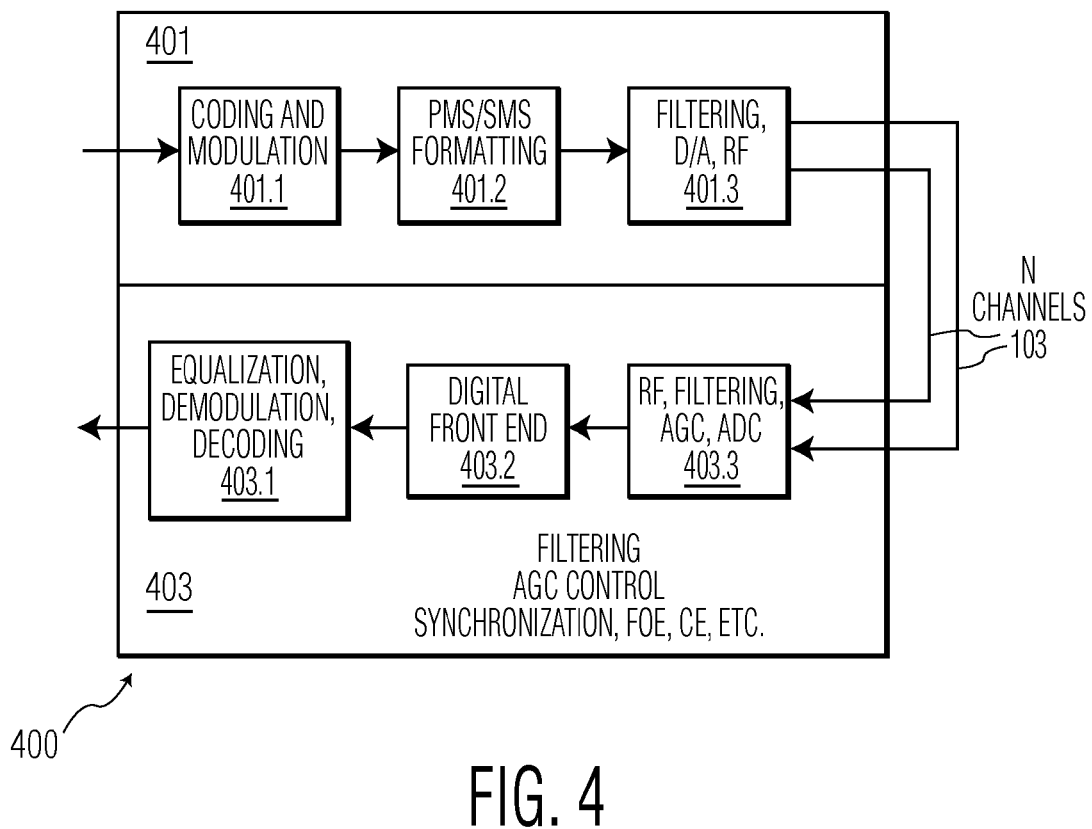
FIG. 4 illustrates a transceiver apparatus modified according to the present invention.

FIG. 4 illustrates a preferred embodiment of a transceiver 400 comprising a transmitter 401 and a receiver 402, modified according to the present invention. The transmitter 401 further comprises a coding and modulation component 401.1 whose output is input to a superframe formatting module 401.2 that formats the output of the coding and modulation component into one of an SMS 200 or PMS 100 or NMS 300, according to the present invention. After formatting, according to the present invention, the signal is filtered, DA converted and transmitted over the channel 402 by module 401.3.

A signal including a superframe according to the present invention is received by receiver 403 modified according to the present invention and comprising a module for filtering, AGC control, etc. 403.3 of the received signal and providing an output signal to a digital front end 403.2 which further processes the signal, e.g., to discover the network.

Figure 5:
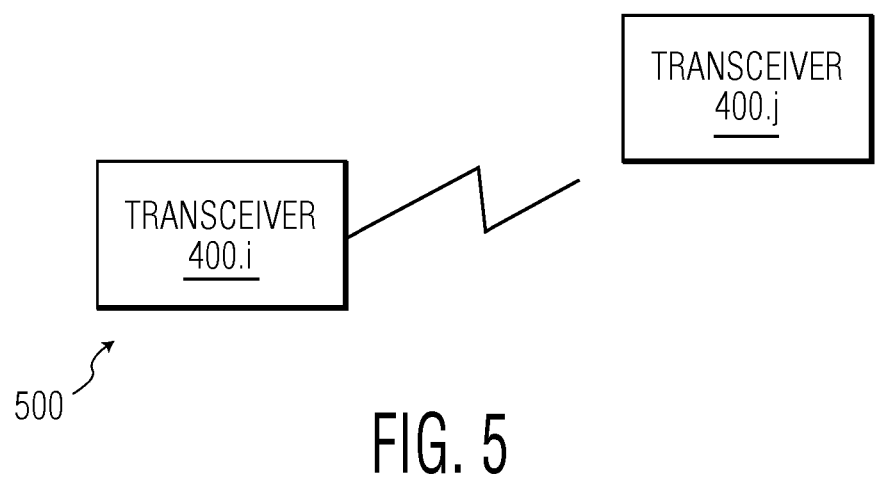
FIG. 5 illustrates a wireless communication system modified according to the present invention.

FIG. 5 illustrates a communication system comprising transceivers 500 according to the present invention that transmit and receive messages comprising a superframe structure 100 200 300 according to the present invention.

The present invention can be advantageously employed in forthcoming networking standards in development under the IEEE auspices, such as IEEE 802.22 based on cognitive radio approaches in the TV band. A multi-channel MAC is very suitable to such and operating environment.

Finally, it is important to note that some of these design goals may be more easily accomplished by using one architecture rather than the other. Therefore, it will be understood by those skilled in the art that the suitability of each of these architectures will depend on the application requirements and protocol design.

While the preferred embodiments of the present invention have been illustrated and described, it will also be understood by those skilled in the art that the system, apparatus' and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto as well as all implementation techniques.

We claim:

1. A wireless communication system that employs a multi-channel MAC protocol based on a superframe concept, comprising:

a multi-channel PHY superframe structure that logically organizes a plurality of channels including a superframe per channel having a control window of a fixed duration and a remaining part, one of said plurality of channels being a logical channel defined as a meeting point/rendezvous channel used by a device to synchronize with the system; and at least one device configured to include:
  a transmitter that transmits superframes according to said PHY superframe structure; and
  a receiver that listens for said PHY superframe structure on a predetermined set of channels of the plurality of channels, wherein, with a pre-determined periodicity said at least one device synchronizes/resynchronizes with the system by the receiver listening to the rendezvous channel; and wherein the PHY superframe structure is selected from the group consisting of parallel multi-channel superframe (PMS) transmitted such that superframes are transmitted in parallel in each channel of said plurality, and a non-overlapping multi-channel superframe (NMS) such that control windows of sequentially transmitted superframes do not overlap by more than a pre-determined overlap allowance value.

2. The system of claim 1, wherein the superframe concept is based on an IEEE 802.11 protocol.

3. The system of claim 1, wherein when the PHY superframe structure is a PMS:
the at least one device synchronizes/resynchronizes with the system by performing a scan of a control window of at least one next superframe of the PMS structure, said scan being selected from the set consisting of scan of the meeting point/rendezvous channel and scan each channel of the plurality of channels; and
once the at least one device is synchronized/resynchronized with the system, a transmitter of the synchronized at least one device transmits data in any of the plurality of channels simultaneously during the remaining part of the at least one superframe of the PMS structure.

4. The system of claim 3, wherein the transmitter of said at least one device transmits a beacon in a beacon frame during each control window.

5. The system of claim 4, wherein at least one of the receiver of said at least one device listens and the transmitter of said at least one device transmits during the control window to schedule the use of the plurality of channels using a pre-determined conflict-free scheduling technique.

6. The system of claim 5, wherein the receiver of said at least one device listens to the rendezvous channel when a broadcast/multicast is scheduled for transmission.

7. The system of claim 6, wherein transmissions by the transmitter of said at least one device are distributed across all channels of the plurality of channels such that the transmission load of the system is leveled across all channels.

8. The system of claim 1, wherein when the PHY superframe structure is an NMS:
the at least one device synchronizes/resynchronizes with the system by performing a sequential scan of the control window of each of a sequence of superframes of the NMS structure across the plurality of channels and the receiver of the at least one device listening for at least the fixed duration of the control window of each superframe of said sequence to discover an intended destination; and
once the at least one device is synchronized/resynchronized with the system, the transmitter of the at least one device transmits data in the remaining part of the superframe of the discovered destination.

9. A method for a PHY in wireless communication system having at least one device, said at least one device employing a multi-channel MAC protocol based on a superframe concept, comprising the steps of:
providing a multi-channel PHY superframe structure that logically organizes a plurality of channels, said structure comprising a PHY superframe per channel of said plurality of channels, said PHY superframe comprising a control window of a fixed duration and a remaining part;
defining one of said plurality of channels as a logical channel that is a meeting point/rendezvous channel used by said at least one device to synchronize with the system; and
configuring said at least one device to perform the steps of:
transmitting by a transmitter thereof the PHY superframe according to said PHY superframe structure,
listening by a receiver thereof for the PHY superframe on a predetermined set of channels of the plurality of channels in accordance with said PHY superframe structure,
periodically tuning to the rendezvous channel by said at least one device to synchronize/resynchronize with the system;
wherein said providing further includes selecting the PHY superframe structure as at least one structure from the group consisting of parallel multi-channel superframe (PMS) transmitted such that superframes are transmitted in parallel in each channel of said plurality and a non-overlapping multi-channel superframe (NMS) such that control windows of sequentially transmitted superframes do not overlap by more than a pre-determined overlap allowance value.

10. The method of claim 9, wherein the superframe concept is based on an IEEE 802.11 protocol.

11. The method of claim 9, wherein when the PHY superframe structure is a PMS further comprising the steps of:
the at least one device synchronizing with the system by performing a scan of the control window of a next superframe of said PMS, said scan selected from the set consisting of scan of the meeting point/rendezvous channel and scan each channel of the plurality of channels; and
once the at least one device is synchronized with the system, a transmitter of the synchronized device transmitting data in any of the plurality of channels simultaneously during the remaining part of the next superframe.

12. The method of claim 11, further comprising the step of transmitting by said at least one device a beacon in a beacon frame during each control window.

13. The method of claim 12, further comprising the step of said at least one device at least one of listening and transmitting during the control window to schedule the use of the plurality of channels in accordance with a pre-determined conflict-free scheduling technique.

14. The method of claim 13, further comprising the step of said at least one device listening to the rendezvous channel when a broadcast/multicast is scheduled for transmission.

15. The method of claim 14, further comprising the step of distributing transmissions of said at least one device across all channels of the plurality of channels such that a transmission load is leveled across all channels.

16. The method of claim 9, wherein when the PHY superframe structure is an NMS further comprising the steps of:
the device synchronizing with the system by performing a sequential scan across the control window of a next superframe of each of the plurality of channels of the NMS and listening for at least the fixed duration of the control window to discover an intended destination; and
once the at least one device is synchronized with the system, a transmitter of the new and synchronized device transmitting data in the remaining part of the superframe of the NMS of the discovered destination.

17. A device for wireless communication that employs a multi-channel MAC protocol based on a superframe concept, comprising:
a multi-channel PHY superframe structure that logically organizes a plurality of channels including a superframe per channel having a control window of a fixed duration and a remaining part, one of said plurality of channels being a logical channel defined as a meeting point/rendezvous channel used by the device to synchronize with a network of similarly configured devices;
a transmitter that transmits superframes according to said PHY superframe structure; and
a receiver that listens for superframes of said PHY superframe structure on a predetermined set of channels of a plurality of channels,
wherein, with a pre-determined periodicity said device synchronizes/resynchronizes with the network by tuning to the rendezvous channel; and
wherein the PHY superframe structure is at least one structure selected from the group consisting of parallel multi-channel superframe (PMS) transmitted such that superframes are transmitted in parallel in each channel of said plurality of channels and a non-overlapping multi-channel superframe (NMS) such that superframes transmitted in sequential channels of said plurality of channels overlap by less than a pre-determined overlap value.

18. The device of claim 17, wherein the superframe concept is based on an IEEE 802.11 protocol.

19. The device of claim 17, wherein when the PHY superframe structure is a PMS:
  the device synchronizes/resynchronizes with the network by performing a scan of a control window of at least one next superframe of the PMS structure, said scan being selected from the set consisting of scan of the meeting point/rendezvous channel and scan each channel of the plurality of channels; and
  once the device is synchronized/resynchronized with the network, the transmitter of the synchronized/resynchronized device transmits data in any of the plurality of channels simultaneously during the remaining part of the at least one superframe of the PMS structure.

20. The device of claim 19, wherein the transmitter of said device transmits a beacon in a beacon frame during each control window.

21. The device of claim 20, wherein the receiver of said device listens and the transmitter of said device transmits during the control window to schedule the use of the plurality of channels using a pre-determined conflict-free scheduling technique.

22. The device of claim 21, wherein the receiver of said device listens to the rendezvous channel when a broadcast/multicast is scheduled for transmission.

23. The device of claim 22, wherein transmissions by the transmitter of said device are distributed across all channels of the plurality of channels such that transmission load of the network is leveled across all channels.

24. The device of claim 17, wherein when the PHY superframe structure is an NMS:
  the device synchronizes/resynchronizes with the network by performing a sequential scan of the control window of each of a sequence of superframes of the NMS structure across the plurality of channels and the receiver listening for at least the fixed duration of the control window of each superframe of said sequence to discover an intended destination; and
  once the device is synchronize/resynchronized with the network, the transmitter of the synchronized/resynchronized device transmits data in the remaining part of the superframe of the discovered destination.

* * * * *